May 28, 1929.    M. HEDLUND    1,715,288

ELECTRIC ACCUMULATING RANGE

Filed Nov. 27, 1926

Inventor
Mats Hedlund
By
Attorney

Patented May 28, 1929.

1,715,288

UNITED STATES PATENT OFFICE.

MATS HEDLUND, OF STOCKHOLM, SWEDEN.

ELECTRIC ACCUMULATING RANGE.

Application filed November 27, 1926, Serial No. 151,188, and in Sweden December 19, 1925.

Figure 1:
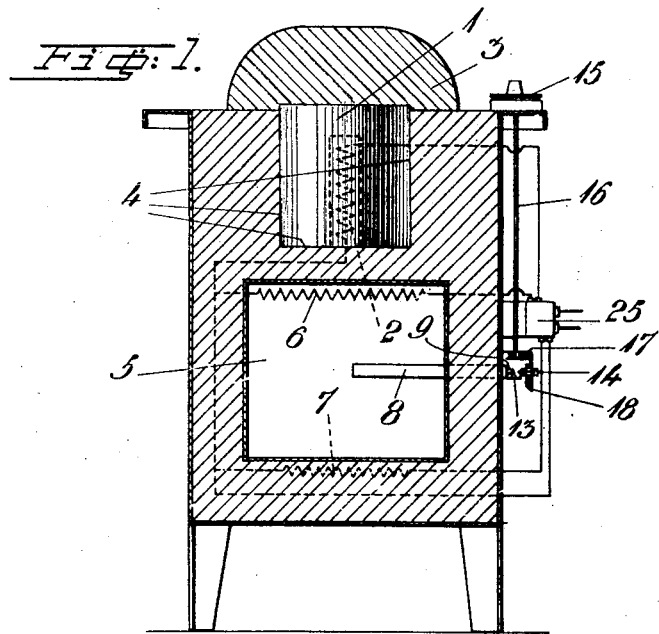
Figure 2:
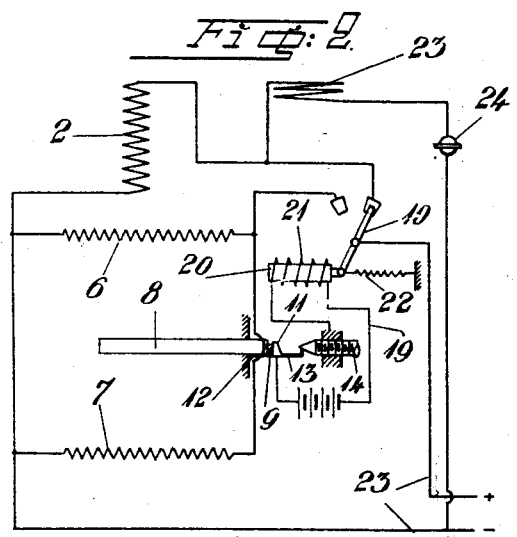

The present invention relates to improvements in electric, accumulating ranges with oven serving as a cooking box and roasting or baking oven. On the accompanying drawing Fig. 1 shows the range diagrammatically in vertical section. Fig. 2 is an electric circuit diagram.

1 is the heat accumulating mass of metal or heat-store which is heated by means of an electric heating element 2 and is surrounded by heat insulating lid 3 and walls 4. The food is cooked upon the uncovered mass of metal 1. 5 is the oven which is heated by means of a divided heating element 6, 7. According to the invention a heat regulator 8, 9, located on the oven for regulating the temperature in the oven, is connected with a switch 10, which is arranged so that by the action of the heat regulator the current is switched over from the element 6, 7 to the element 2 as soon as the temperature of the oven set for the occasion has been reached, and for disconnecting the current to the element 2 and switch it over to the element 6, 7 as soon as the oven-temperature drops below that for which it has been set. By this means is avoided an adding of the current consumption of the mass of metal and the oven, and a constant and minimum consumption of current is obtained. The heat regulator passes into the oven-space through the wall of the oven and is fixed in the same with its outer, tubular portion 8. Its inner, bar-shaped portion 9 projects beyond the part 8 and co-operates with a projection 11 on a spring 13 attached at 12. The free end of the spring co-operates with a taper-point upon a screw 14, which for setting the oven-temperature is adjustable by hand in its longitudinal direction by means of a button 15 on a rotatable shaft 16, which by means of a toothed wheel 17 engages a toothed wheel 18 located upon the screw as a nut. 19 is a weaker circuit which is closed when the spring 13 forms a contact with the screw 14, when the iron core 20 of a solenoid 21 moves in the solenoid against the action of the spring 22 and makes the switch 10 assume the position shown in Fig. 2, with the element 2 connected up with the main circuit 23. In this position of the parts the oven has its pre-determined temperature. If it drops, the part 9 projects further and pushes the spring 13 out of contact with the screw 14, when the circuit 19 becomes currentless and the switch 10 is by the spring 22 switched over and breaks the main circuit to the element 2, connecting the element 6, 7 up with the main circuit. According to the invention an electric heating element 23 for a warm water tank (with heat regulator) may also be parallel-coupled with the element 2 in the main circuit and provided with a hand operated switch 24 in order, when so desired, to heat the water, when the main current is connected up with the element 2. The switch 10 is shown located in a box or housing 25 on the range, but it may also be located at any other spot than the range.

What I claim is:

An electric range including a supporting structure, a heat accumulating mass mounted therein and having one face exposed, a heating element carried by said mass, an oven mounted in the structure, a heating element for the oven, a thermostat mounted in the oven to be affected by the heat therein, a switch controlled by said thermostat, and two electrical circuits, one of such circuits including a source of electrical energy, one of said heating elements and the switch, and the other circuit including the other heating element, the source of electrical energy and said switch, whereby when the heat in the oven has attained a predetermined temperature the switch is operated to cut out the oven heating element and to cut in the heating element of the mass, or vice versa.

In testimony whereof, I have signed my name to this specification at Stockholm, Sweden, this 19th day of October, 1926.

MATS HEDLUND.